United States Patent

Fukushima et al.

(10) Patent No.: US 9,588,394 B2
(45) Date of Patent: Mar. 7, 2017

(54) OPTICAL APPARATUS AND AUTOMOBILE LIGHTING

(71) Applicants: STANLEY ELECTRIC CO., LTD., Meguro-ku, Tokyo (JP); NATIONAL UNIVERSITY CORPORATION CHIBA UNIVERSITY, Chiba-shi, Chiba (JP)

(72) Inventors: Hiroto Fukushima, Yokohama (JP); Yasuo Toko, Yokohama (JP); Norihisa Kobayashi, Chiba (JP)

(73) Assignee: STANLEY ELECTRIC CO., LTD., Chiba-Shi, Chiba (JP)

(*) Notice: Subject to any disclaimer, the term of this patent is extended or adjusted under 35 U.S.C. 154(b) by 240 days.

(21) Appl. No.: 14/511,016

(22) Filed: Oct. 9, 2014

(65) Prior Publication Data

US 2015/0117041 A1     Apr. 30, 2015

(30) Foreign Application Priority Data

Oct. 24, 2013 (JP) .................................. 2013-221261

(51) Int. Cl.
   *B60Q 1/00* (2006.01)
   *G02F 1/163* (2006.01)
   (Continued)

(52) U.S. Cl.
   CPC .......... *G02F 1/163* (2013.01); *F21S 48/1225* (2013.01); *F21S 48/1233* (2013.01);
   (Continued)

(58) Field of Classification Search
   CPC ............... F21S 48/1225; F21S 48/1233; F21S 48/1731; G02F 1/1506; G02F 1/1512; G02F 1/163; G02F 1/23
   See application file for complete search history.

(56) References Cited

U.S. PATENT DOCUMENTS 6,166,848 A * 12/2000 Cammenga .......... B60Q 1/2665
                                                                    359/265
9,254,789 B2 * 2/2016 Anderson ............... B60R 1/088
(Continued)

FOREIGN PATENT DOCUMENTS

EP   1764645 A1   3/2007
FR   2605056 A1   4/1988
(Continued)

OTHER PUBLICATIONS

Extended European Search Report dated Dec. 17, 2014 issued in counterpart European Application No. 14188639.0.

*Primary Examiner* — Ali Alavi
(74) *Attorney, Agent, or Firm* — Holtz, Holtz & Volek PC

(57) ABSTRACT

An optical apparatus includes first and second substrates disposed to oppose each other, the first substrate having a first electrode provided on a surface of the first substrate nearer to the second substrate, and the second substrate having a second electrode provided on a surface of the second substrate nearer to the first substrate, and an electrolyte layer sandwiched between the first and the second substrates, and containing electro-deposition material including silver, wherein when potential of the first electrode is used as reference, a first voltage of positive polarity is applied in a first period to the second electrode, and a second voltage of positive polarity lower than the first voltage is applied in a second period after the first period to the second electrode.

8 Claims, 6 Drawing Sheets

(51) Int. Cl.
*F21S 8/10* (2006.01)
*G02F 1/15* (2006.01)

(52) U.S. Cl.
CPC ....... *F21S 48/1731* (2013.01); *F21S 48/2212* (2013.01); *F21S 48/2218* (2013.01); *G02F 1/1506* (2013.01)

(56) References Cited

U.S. PATENT DOCUMENTS

| | | | | |
|---|---|---|---|---|
| 2003/0152315 | A1* | 8/2003 | Zhang | G02B 6/3538 385/18 |
| 2007/0063964 | A1 | 3/2007 | Kawahara et al. | |
| 2007/0206263 | A1* | 9/2007 | Neuman | B60R 1/088 359/267 |
| 2015/0117041 | A1* | 4/2015 | Fukushima | F21S 48/1731 362/487 |

FOREIGN PATENT DOCUMENTS

| | | | |
|---|---|---|---|
| GB | 2211923 | A | 7/1989 |
| JP | 2010002573 | A | 1/2010 |
| JP | 2012181389 | A | 9/2012 |

\* cited by examiner

OPTICAL APPARATUS AND AUTOMOBILE LIGHTING

CROSS REFERENCE TO RELATED APPLICATION

This application is based on and claims priority on Japanese Patent Application 2013-221261, filed on Oct. 24, 2013, the entire contents of which are incorporated herein by reference.

BACKGROUND OF THE INVENTION

A) Field of the Invention

This invention relates to an optical apparatus and an automobile lighting including an electro-deposition element.

B) Description of the Related Art

A so-called electro-deposition element is disclosed, for example in Japanese Laid-open Patent Publication 2012-181389. Here, the electro-deposition element includes mainly a pair of electrodes disposed to oppose each other, and electrolyte layer containing silver, disposed between the pair of electrodes.

In stationary state (in the absence of applied voltage), the electrolyte layer is substantially transparent, and the electro-deposition element takes transparent state. When a voltage is applied between the pair of electrodes, electro-deposition material (silver) in the electrolyte layer precipitates/deposits on an electrode by oxidation/reduction reaction. By this phenomenon, the electro-deposition element takes mirror state.

SUMMARY

According to an aspect of this invention, there is provided an optical apparatus comprising optical element and power source, wherein:

the optical element comprises, first and second substrates disposed to oppose each other, the first substrate having a first electrode provided on a surface of the first substrate nearer to the second substrate, and the second substrate having a second electrode provided on a surface of the second substrate nearer to the first substrate, and an electrolyte layer sandwiched between the first and the second substrates, and containing electro-deposition material including silver; and the power source is connected to the first and second electrodes, and is capable of applying plural types of voltage to the electrolyte layer through the first and second electrodes and changing color states of the optical element.

BRIEF DESCRIPTION OF THE DRAWINGS

FIG. 3C is an enlarged plan view showing part of the seal member 40a.

DESCRIPTION OF THE PREFERRED EMBODIMENTS

Figure 1A:
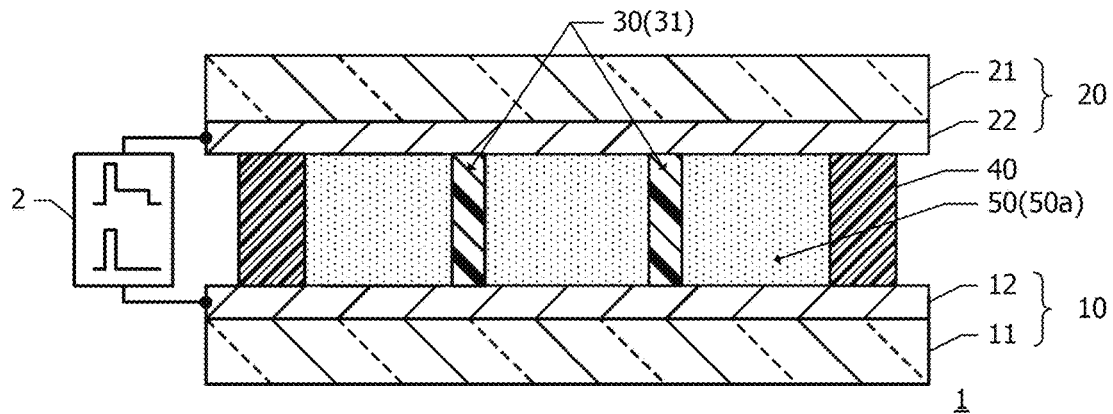
FIG. 1A is a cross section of a basic structure of an optical apparatus including an electro-deposition (ED) element 1.
Figure 1B:
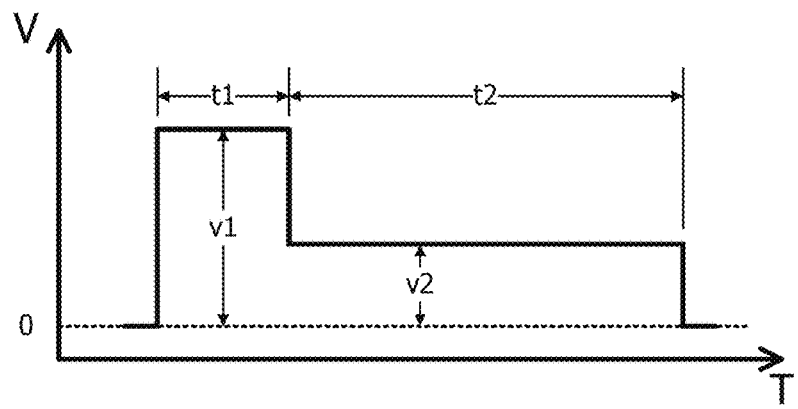
FIG. 1B is a graph showing the waveform of step voltage applied to the electro-deposition (ED) element 1.
Figure 1C:
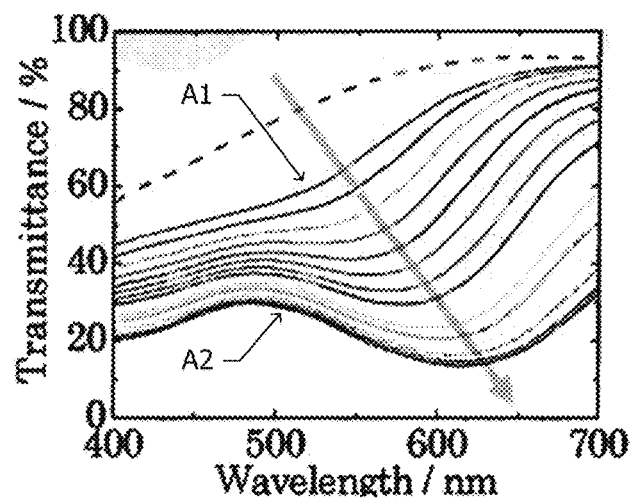
FIG. 1C is a graph showing the spectrum change of the optical transmittance of the electro-deposition element 1 applied with various step voltages.

Referring to FIGS. 1A to 1C, basic structure and driving method of an optical apparatus according to an embodiment of the invention will be described. In FIG. 1A, the optical apparatus 1a includes an electro-deposition (ED) element 1, and a power source 2 connected to the ED element 1 for supplying driving voltage thereto.

The ED element 1 has opposing lower and upper substrates 10 and 20 including lower and upper base substrates 11 and 21 and lower and upper electrodes 12 and 22 formed on the upper surface of the lower base substrate 11 and on the lower surface of the upper base substrate 21. Sealing frame 40 and an electrolyte layer (electrolyte liquid) 50 are sandwiched between the lower and upper substrates 10 and 20. The sealing frame 40 is formed in a closed shape positioned along the periphery of the lower and upper substrates 10 and 20 in the opposing surfaces of the lower and upper substrates 10 and 20. The electrolyte layer 50 is filled in the space 50a defined by the lower and upper substrates 10 and 20 and the sealing frame 40.

The lower substrate 10 has a structure in which the lower electrode 12 is formed on the upper surface of the lower base substrate 11. The upper substrate 20 has a structure in which the upper electrode 22 is formed on the lower surface of the upper base substrate 21.

The lower and the upper base substrates 11 and 21 may be formed, for example, of plastic films having light transparency and flexibility, which may be formed of polycarbonate or polyethylene terephthalate (PET). Here, it may also be possible to use blue sheet glass or white sheet glass, etc. having no flexibility. The lower and upper electrodes 12 and 22 are formed of a material having light transparency and electric conductivity, for example of indium tin oxide (ITO), indium zirconium oxide (IZO), and graphene. The lower and upper electrodes may be patterned in predetermined planar shapes. In examples, the lower and upper substrates 10 and 20 are formed of polycarbonate films of 0.1 mm thick provided with IZO electrodes.

A plurality of spacers 31 (protrusion layer 30) formed of transparent resin material, etc. is provide in the gap between the lower and upper substrates 10 and 20. The spacers 31 extend from the lower substrate 10 (lower electrode 12) to the upper substrate 20 (upper electrode 22), and define the gap between the lower and upper substrates 10 and 20 (cell thickness).

The spacers 31 have such shapes as cylinder having a diameter of 50 micrometers to 150 micrometers, and a height of around 100 micrometers. The spacers 31 are uniformly distributed in the surface of the lower substrate 10. The surface occupation ratio (density) of the spacers 31 in the display area in the sample was about 3.8%.

The sealing frame 40 is sandwiched between the lower and upper substrate s 10 and 20, and has a general planar shape of rectangular frame. The sealing frame 40 may be formed of light transparent resin material of ultraviolet light setting type.

The electrolyte layer (electrolyte liquid) 50 fills the space 50a surrounded by the lower and upper substrates 10 and 20, and the sealing frame 40. The electrolyte layer 50 may be formed, for example of mixture of an electro-deposition (ED) material (such as $AgNO_3$), electrolyte material (tetra-butylammonium bromide (TBABr) etc.), mediator ($CuCl_2$ etc.), support electrolyte (LiBr etc.), solvent (dimethyl-sulfoxide (DMSO) etc.). Gelation polymer such as polyvinyl-butyral (PVB) may be added to the electrolyte, to let the electrolyte in gel (jelly) state. In the examples, 50 mM of $AgNO_3$ as the ED material, 250 mM of LiBr as the support electrolyte, and 10 mM of $CuCl_2$ as the mediator, are added in the solvent of DMSO.

ED material is the material which precipitates/deposits constituent metal and the deposited metal disappears by oxidation or reduction process on the surfaced of the lower or upper electrode 12 or 22. As the ED material, for example, $AgNO_3$, $AgClO_4$, AgBr, etc. may be used.

The support electrolyte promotes oxidizing or reducing reaction of the ED material. As the support electrolyte, lithium salt (such as LiCl, LiBr, LiI, $LiBF_4$, $LiClO_4$, etc.), potassium salt (such as KCl, KBr, KI, etc.) or sodium salt (such as NaCl, NaBr, NaI, etc.) may be appropriately used.

The mediator is the material which performs oxidation/reduction at electrochemical energies lower than that of Ag. The mediator may be $CuCl_2$, $CuSO_4$, $CuBr_2$, or the like including Cu.

The solvent is not limitative provided that it can stably support the ED material, etc. For example, the solvent may be polar solvent such as water and carbonic propylene, non-polar organic solvent, further ionic liquid, ionic electrically conductive polymer, polymer electrolyte, etc. may be used. More specifically, carbonic propylene, N,N-dimethylformamide, tetrahydrofuran, acetonitrile, polyvinyl sulfonic acid, polystyrene sulfonic acid, polyacrylic acid, etc. may be appropriately used.

The power source 2 is connected between the lower and upper electrodes 12 and 22. The power source 2 can apply various voltages across the electrolyte layer 50.

In the absence of applied voltage, the electrolyte layer 50 is generally transparent, and the ED element presents transparent state.

When the voltage of the lower electrode 12 is used as reference, a positive voltage (for example, about 2.5 volts for several seconds) is applied to the upper electrode (with reference to the upper electrode 22, a negative voltage is applied to the lower electrode 12), silver ions (ED material) in the electrolyte layer 50 are reduced on the surface of the lower electrode 12, and a silver thin film (highly reflective film) is precipitated. Upon this action, the ED element 1 presents a mirror state. In case when a negative voltage, with reference to the lower electrode, is applied to the upper electrode 22, a silver thin film (highly reflective film) precipitates on the surface of the upper electrode 22.

When the voltage application between the lower and upper electrodes 12 and 22 is stopped or removed, the silver (thin film) precipitated on the surface of the lower electrode 12 is dissolved into the electrolyte layer as silver ions, and disappears from the surface of the lower electrode 12. Thereby, the ED element 1 realizes transparent state again.

The present inventors discovered that the wavelength dependency of the light transmittance of the ED element 1 changes when stepped voltage is applied to the ED element from the power source 2. Hereinafter, regarding to the voltage applied between the lower and upper electrodes 12 and 22, i.e. across the electrolyte layer 50, description will be made on the assumption that the voltage applied to the lower electrode 12 is the reference voltage (ground voltage).

FIG. 1B is a graph showing voltage waveform applied between the lower and upper electrodes 12 and 22 from the power source 2 for a certain period. The abscissa represents time, and ordinate represents the voltage applied to the electrolyte layer 50, i.e. the electric potential of the upper electrode 22 with respect to the electric potential of the lower electrode 12.

The power source 2 applies a first electric potential v1 to the upper electrode 22 in a first period t1, and applies a second electric potential v2 lower than the first electric potential v1 in a second period t2 after the first period t1.

It is considered that the first electric potential generates at least nuclei of silver, and that the second electric potential grows silver film from the nuclei. The second electric potential lower than the first electric potential may contribute to change the wavelength dependency of the light transmittance (that is, color state) of the ED element 1 (especially, the silver film).

FIG. 1C is a graph showing light transmittance spectra of the ED element 1 when various step voltages are applied to the ED element 1 from the power source 2. Ordinate represents the light transmittance of the ED element 1, and abscissa represents wavelength of light transmitting through the ED element 1.

The spectrum designated by A1 is the light transmittance spectrum of the ED element 1, when the first period t1 is 100 ms (milliseconds), the first voltage v1 is 3 V (volts), the second period t2 is 1.4 s (seconds), and the second voltage v2 is 1.5 V. This light transmittance spectrum of A1 has relatively high light transmittance over the whole visible light wavelength range.

The spectrum designated by A2 is the light transmittance spectrum of the ED element 1, when the first period t1 is 100 ms, the first voltage v1 is 3 V, the second period t2 is 20.7 s, and the second voltage v2 is 1.5 V. The difference in the conditions from A1 lies in the second period, i.e. 1.4 s for A1, and 20.7 s for A2. This light transmittance spectrum of A2 has relatively low light transmittance over the whole visible light wavelength range.

The second period was changed from 1.4 s to 20.7 s, at step of 1.3 to 1.4 s. FIG. 1C shows light transmittance spectra for these conditions. As the second period is made longer, the light transmittance becomes gradually lower in the whole region of the visible light range.

These spectra show clear tendency that when the second period is relatively short, the light transmittance of the ED element 1 in long wavelength side is higher than that in short wavelength side. In this case, the ED element appears to look reddish, showing red colored state.

On the other hand, when the second period is relatively long, the light transmittance of the ED element 1 in short wavelength side becomes higher than that in long wavelength side. In this case, the ED element appears to look bluey, showing blue colored state.

As above, the wavelength dependency of the light transmittance of the ED element can be controlled by appropriately adjusting the step voltage applied to the ED element. That is, the ED element can be controlled not only in transparent state and mirror state, but also in plurality of colored states. Due to such characteristics, the ED element can also be utilized as color filter of variable light transmittance spectrum.

Here, the voltage applied to the ED element may have the second voltage v2 set at zero voltage. In this case, the applied voltage is not a stepped two-stage voltage, and is a one stage voltage. The ED element can be driven in transparent state and in mirror state by on-off controlling the one stage voltage.

Referring to FIGS. 2A, 2B, 3A to 3C, 4A, 4B, and 5A to 5C, processes for manufacturing the optical apparatus (mainly the ED element) will be described. In embodiment, ED element 1 is manufactured in roll to roll method in which two sheet-shaped flexible substrates are transported in a predetermined direction, and formation or machining of various members are successively done on the substrates.

Firstly, two sheet-shaped flexible substrates (corresponding to substrates 10 and 20 in FIG. 1A) provided with electrodes (corresponding to electrodes 12 and 22 in FIG. 1A) on surfaces of base films (corresponding to base substrates 11 and 21 in FIG. 1A) are prepared. According to necessity, the electrodes on the surface of the flexible substrates are patterned in desired planar shape by etching or laser abrasion, etc.

The base films may be formed of plastic films formed of polycarbonate or polyethylene terephthalate (PET), etc. The electrodes may be formed of ITO, IZO, or graphen, etc. One of the two flexible substrate is used as the lower substrate 10, and the other of the two flexible substrates is used as the upper substrate 20.

Figure 2A:
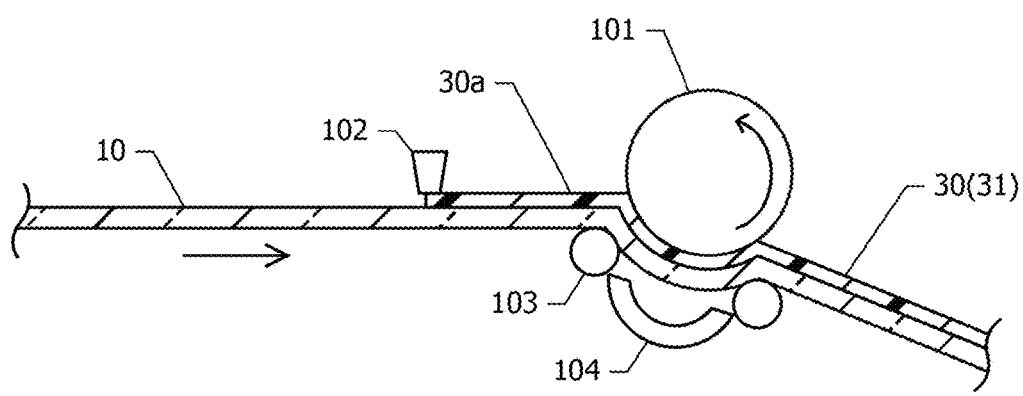
FIG. 2A is a cross section showing the manner of forming a protrusion layer 30 on a surface of a lower substrate 10.
Figure 2B:
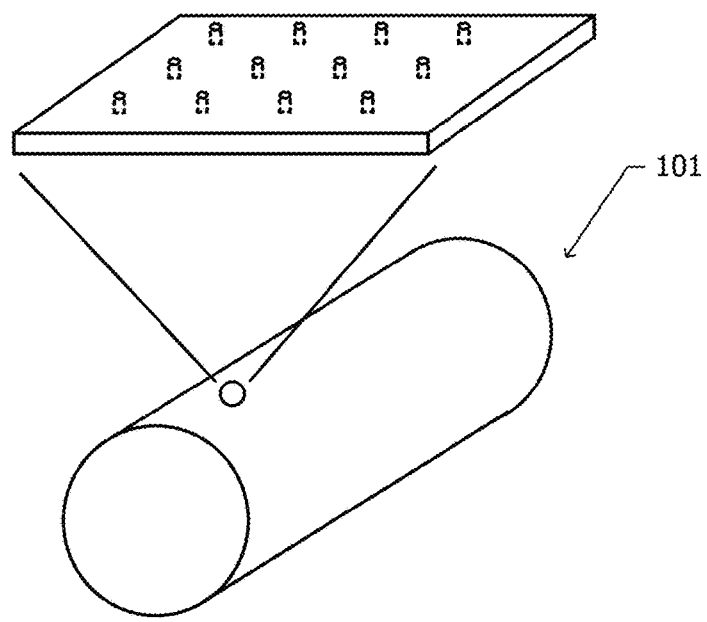
FIG. 2B is a perspective view showing a roll shaped metal die 101 formed with projection pattern of cylindrical holes, used in forming the protrusion layer 30.

FIG. 2A is a cross section showing how a protrusion layer 30 (spacers 31) is formed on the surface of the lower substrate 10. FIG. 2B is a schematic view showing a roll-shaped metal die 101 formed with projection (cylindrical holes) pattern, to be used in forming the protrusion layer 30.

As shown in FIG. 2A, while the lower substrate 10 is transported in the lengthwise direction, for example at a speed around 0.1 m/s, resin member 30a for forming a protrusion layer 30 is coated on the lower substrate 10 through a supply head (ink jet, dispenser, etc.) 102. The resin member 30a may be formed of ultraviolet setting resin of acrylic, aryl, or epoxy containing resin.

Then, the resin member 30a coated on the lower substrate 10 is pressed onto the roll-shaped metal die 101 by nip rolls 103, and the roll-shaped metal die 101 is rotated, transferring or copying the projection pattern on the resin member 30a. Ultraviolet rays emitted from ultraviolet ray irradiating device 104 are irradiated onto the resin member 30a from the side of the lower substrate 10, to set the resin member 30a. Thus, a protrusion layer 30 including a plurality of spacers (projections) 31 is formed on the surface of the lower substrate 10.

As shown in FIG. 2B, the roll-shaped metal die has cylindrical general shape, and a plurality of cylindrical holes are formed in side surface in distributed fashion. The cylindrical hole has, for example a depth around 100 micrometers, and a diameter around 50 to 150 micrometers. The area ratio of cylindrical holes in a unit area (density) is 1 to 10%, for example about 3.8%. Using such roll-shaped metal die 101 and transferring the pattern of cylindrical holes to the resin member 30a, a protrusion layer 30 uniformly distributed with spacers (projections) 31 corresponding to those cylindrical holes can be obtained.

The protrusion layer may be formed on the upper substrate 20. When the protrusion layer 30 is formed on the lower substrate 10, an optical function layer such as ITO particle deposited layer deposited with ITO particles, or prism may be formed on the upper substrate. For example, when an ITO particles deposited layer is formed on the upper substrate, ITO distributed liquid may be coated on the upper substrate by spin coating, etc. and then the coated film may be sintered to form an ITO particle deposited layer.

Figure 3A:
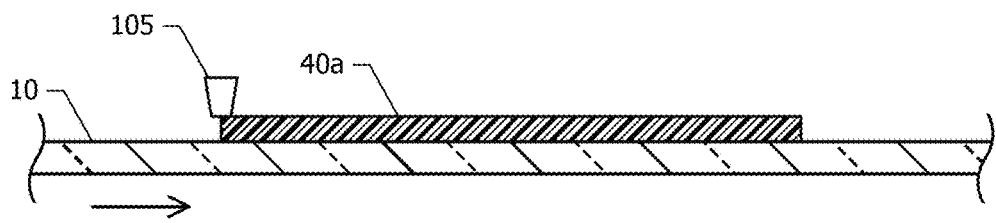
FIGS. 3A and 3B are a cross section and a plan view showing the manner of coating a seal member 40a on a surface of the lower substrate 10.
Figure 3B:
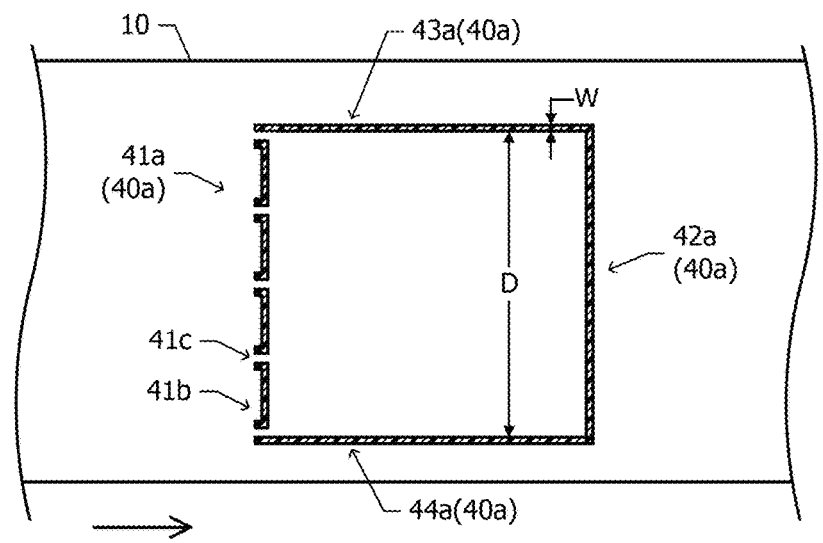
Figure 3C:
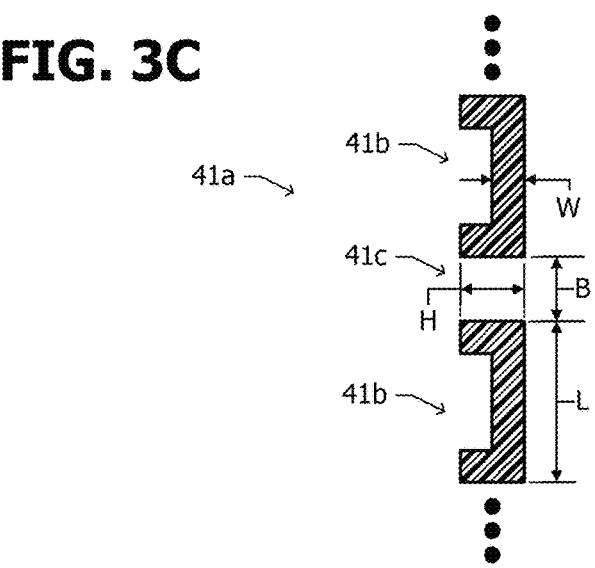

FIGS. 3A and 3B are a cross section and a plan view, showing how a seal member 40a is coated (patterned) on the surface of the lower substrate 10. FIG. 3C is an enlarged plan view showing part of the sealing member. Hereinafter, structure including the lower substrate 10 and the protrusion layer 30 will be simply called as the lower substrate 10.

As shown in FIG. 3A, while the lower substrate 10 is continuously transported in the lengthwise direction, sealing member 40a is coated on the lower substrate 10 by supply head (ink jet, dispenser, etc.) 105. It may be possible to form the sealing member 40a on the upper substrate 20.

The sealing member 40a may be formed of ultraviolet setting resin. The thickness (height) of the sealing member 40a is, for example of the order of 0.1 mm.

As shown in FIG. 3B, the seal member 40a coated on the lower substrate 10 includes edge or side portions 41a to 44a, to constitute a general planar shape of rectangular shape. In the general planar shape of the sealing member 40a, for example respective edge or side portion have a width W of around 1 mm, and each edge or side has a length D of 50 mm. The general shape of the sealing member 40a may be square.

The first edge or side 41a includes separated portions formed of line portions 41b and cut portions 41c, and is transferred backward (in reverse direction with respect to the transportation direction of the lower substrate 10). The second edge or side 42a is opposed to the first edge or side 41a, and is transported forward (in the same direction with respect to the transportation direction of the lower substrate 10). The third edge or side 43a is formed on one side of the first and second edges or sides 41a and 42a along the transportation direction of the lower substrate 10. The fourth edge or side 44a is formed on the other side of the first and second edges or sides 41a and 42a along the transportation direction of the lower substrate 10.

As shown in FIG. 3C, the first edge or side 41a includes line portions 41b and cut portions 41c. Each line portion 41b has wider widths H at both ends than the central width W, with the both ends projecting outwards from the seal member 40a. The shape of the line portion may be called as reversed C shape. For example, the width H at the both ends of the line portion is around 2 mm, and the central width W of the line portion is around 1 mm. The length L of the line portion 41b is around 10 mm, and the length B of the cut portion 41c is around 2 mm.

Figure 4A:
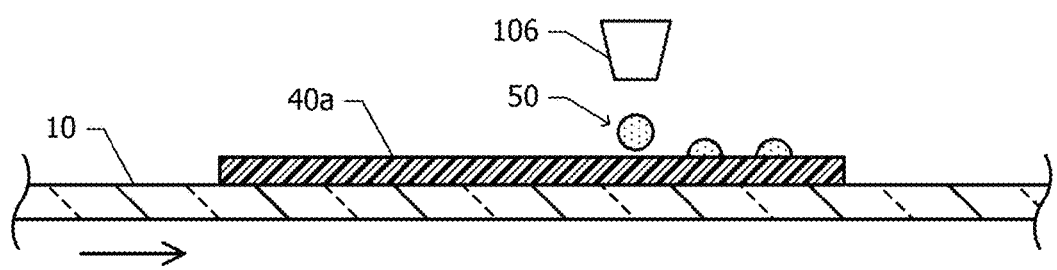
FIGS. 4A and 4B are a cross section and a plan view showing the manner of dropping electrolyte liquid 50 containing electro-deposition (ED) material, in an area surrounded by the seal member on the surface of the lower substrate 10.
Figure 4B:
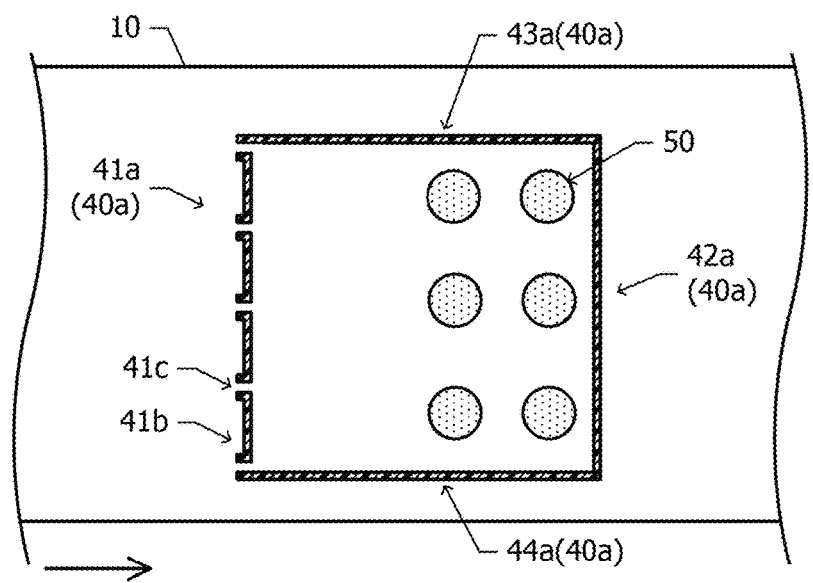

FIGS. 4A and 4B are a cross section and a plan view showing how electrolyte liquid (electrolyte layer) 50 containing ED material is dropped in an area surrounded by the sealing member 40a on the surface of the lower substrate 10.

As shown in FIG. 4A, while the lower substrate 10 is continuously transported in the lengthwise direction, the electrolyte liquid 50 is dropped in the region surrounded by the sealing member 40a on the lower substrate 10 by supply head (ink jet, dispenser, etc.) 106. The electrolyte liquid 50 contains ED material containing silver. It is preferable that the electrolyte liquid 50 contains mediator.

As shown in FIG. 4B, it is preferable that the electrolyte liquid 50 is dropped as concentrated in front side region with respect to the transportation direction of the lower substrate, i.e. in region near the second edge or side 42a of the sealing member 40a. This is because when the upper substrate 20 is pressed and pasted on the lower substrate 10 in a later process (FIGS. 5A to 5C), the space defined by the lower and upper substrates 10 and 20 and the sealing member 40a (seal frame member 40), preferably contains no air or gas bubbles.

The electrolyte liquid 50 may be dropped on the substrate not formed with the sealing member, i. e. on the upper substrate 20. In this case, it is preferable to drop the electrolyte liquid 50 in region on the upper substrate 20, i.e. in region near the second edge or side 42a of the sealing member 40a when the lower and upper substrates 10 and 20 are pasted together in a later process (FIGS. 5A to 5C).

Figure 5A:
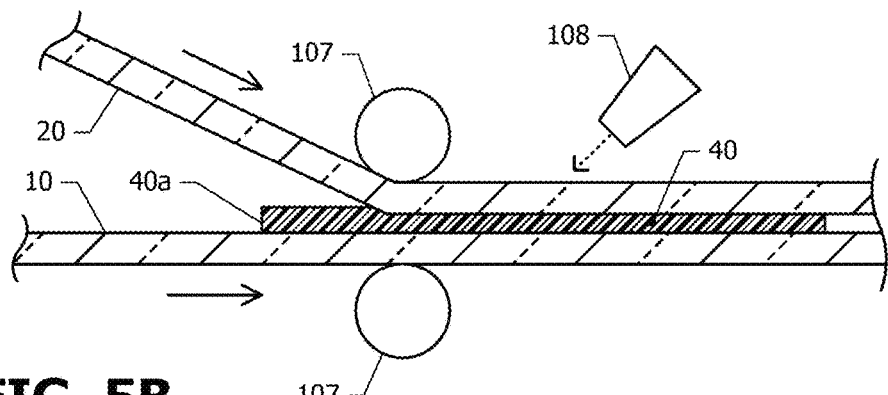
FIGS. 5A to 5C are a cross section and plan views showing the manner of pasting an upper substrate 20 on a lower substrate 10 together.
Figure 5B:
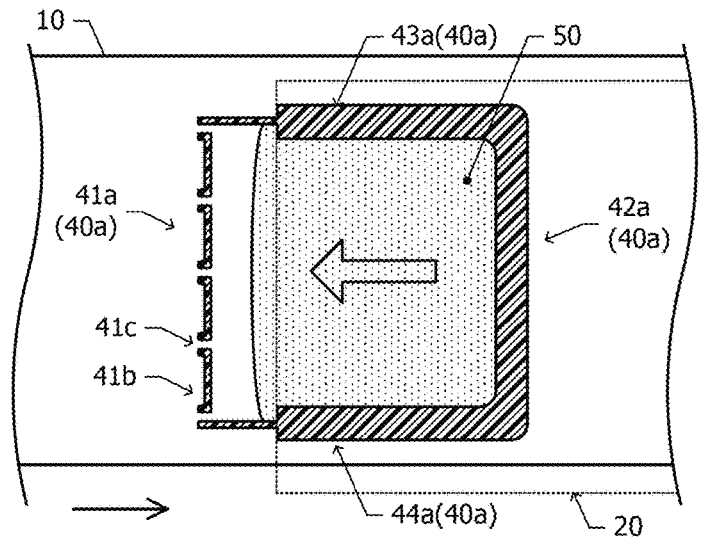
Figure 5C:
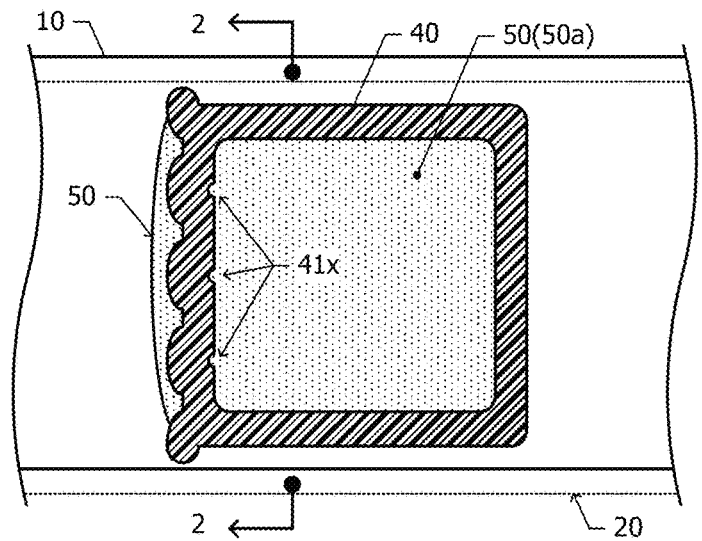

FIGS. 5A to 5C are a cross section and plan views showing how the lower and the upper substrates 10 and 20 are pasted together.

As shown in FIG. 5A, while the lower and upper substrates 10 and 20 are transported, the upper substrate 20 is pasted to the lower substrate 10, sandwiching the sealing member 40a and the electrolyte liquid 50. The lower and upper substrates 10 and 20 are pressed by the nip rolls 107, and are pasted from the forward (right) side to the rear (left) side with respect to the transportation direction, i.e. from the side of the second edge or side 42a to the first edge or side 41a of the sealing member 40a.

Thereafter, the sealing member 40a is irradiated with ultraviolet rays emitted from ultraviolet ray irradiator 108 from the side of the upper substrate 20 to set the sealing member 40a to form a sealing frame 40. Here, the lower and upper substrates 10 and 20 are shifted from each other in the direction perpendicular to the transportation direction, and pasted together for enabling connection of the power source 2 to the lower and upper electrodes 12 and 22.

As shown in FIG. 5B, the lower and upper substrates 10 and 20 are pasted from the side of the second edge or side 42a toward the first edge or side 41a in the sealing member 40a. The sealing member 40a is pressed by the pressure applied from the lower and upper substrates 10 and 20 and is widened thereby. The electrolyte liquid 50 is pressed and widened from the second edge or side 42a toward the first edge or side 41a in the sealing member 40a/

When the pasting between the lower and upper substrates 10 and 20 reaches the first edge or side 41a, excess electrolyte liquid 50 is pushed out together with air through the cut portions 41c toward the outside of the sealing member 40a (seal frame 40). The line portions 41b are pressed and widened by the pressure applied from the lower and upper substrate 10 and 20, to close the cut portions.

As shown in FIG. 5C, in the seal frame 40, concave portions 41x where the inside edges are compressed outward, are formed at positions corresponding to cut portions before being pressed and widened. The outside edge corresponding to the concave portions 41x are swelled toward outside. Some extra electrolyte liquid 50 may be attached to the outside of the seal frame 40.

As above, the electrolyte liquid 50 can be sealed in the space 50a defined by the lower and upper substrate 10 and 20, and the sealing member 40a which is pressed and widened, and then irradiated with ultraviolet rays, i.e. the seal frame 40, without leaving air (bubbles). Further, the electrolyte liquid 50 can be sealed in the space 50a in one step, without need for separately providing seal member (so-called end seal member) for sealing the inlet of electrolyte liquid at a side of the lower and upper substrates 10 and 20. The pasting of the lower and upper substrates 10 and 20 may be done in low pressure atmosphere or in vacuum, for further suppressing remaining air bubbles.

The lower and upper substrates 10 and 20 are cut at the front and rear sides of the cell with respect to the transportation direction, and the electrolyte liquid protruded outside of the seal frame 40 is washed and removed. Thereafter, the power source 2 is connected to the lower electrode 12 exposed outside of the upper substrate 20, and to the upper electrode 22 exposed outside of the lower substrate 10 (see FIG. 5C). The optical apparatus including the ED element and the power source is thus, completed (see FIG. 1A).

Description has been made on the manufacture of the optical apparatus including the ED element by roll to roll method. The ED element can be manufactured by other methods. Substrate plates having no flexibility can be employed as lower and upper substrates in place of flexible films.

Figure 6A:
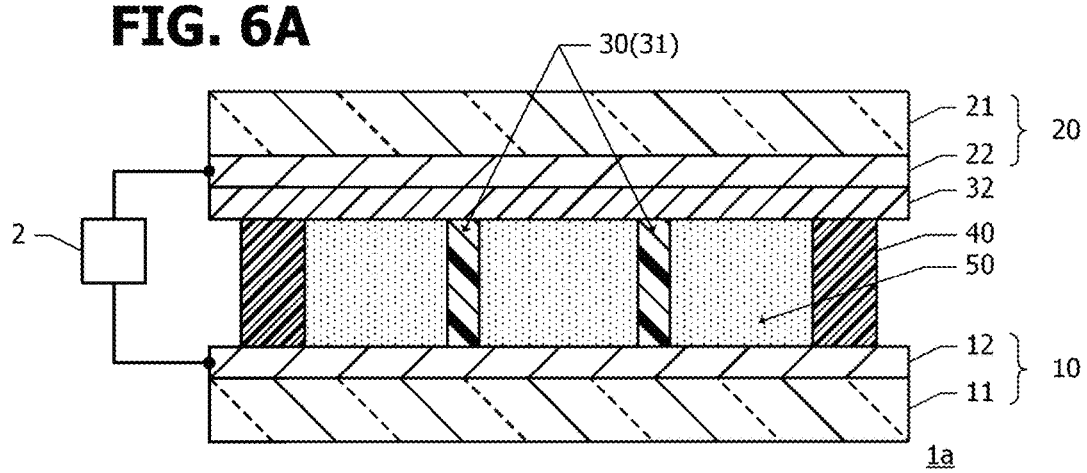
FIG. 6A is a cross section of an optical apparatus including an electro-deposition (ED) element 1a, FIG. 6B is a graph showing waveform of dc voltage applied to the electro-deposition (ED) element 1a, and FIG. 6C is a schematic cross section of automobile lighting (head light or rear lamp unit) provided with an optical apparatus including an electro-deposition element.

FIG. 6A is a cross section showing a modification of the optical apparatus according to the embodiment. In this optical apparatus, a conductive particle deposited layer 32 is provided on the lower surface of the upper electrode 22 in the ED element 1a.

The particle deposited layer 32 has such configuration that for example, ITO particles, etc. having particle diameter of 100 nm to 500 nm are deposited on the upper electrode 22 to a thickness of around 1.5 micrometers. Therefore, the particle deposited layer 32 has fine irregular or uneven surface, which is at least rougher than the surface of the lower electrode 12. It is also possible to provide a particle deposited layer on the surface of the lower electrode 12.

Figure 6B:
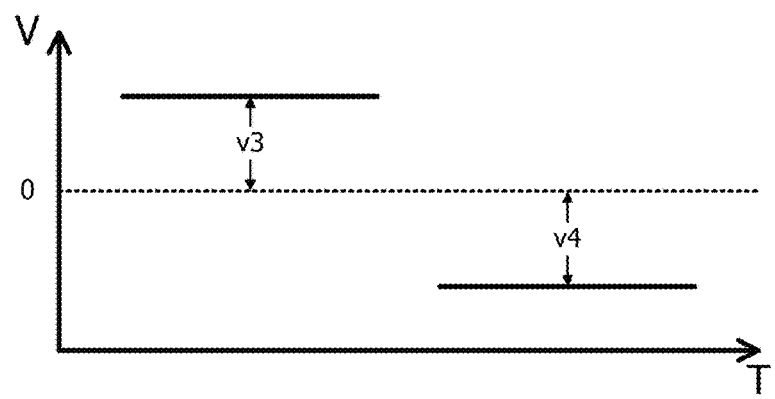

FIG. 6B is a graph showing waveform of the voltage in a certain period, applied between the lower and upper electrodes 12 and 22. The power source 2 connected to the ED element 1a can supply a dc voltage in addition to step voltages.

When the power source 2 supplies a positive voltage v3 (about 2.5 V for several seconds) to the upper electrode 22 with respect to the lower electrode 12, a silver thin film is deposited on the surface of the lower electrode 12. By this phenomenon, the ED element 1a realizes a mirror state.

When the power source 2 supplies a negative voltage v4 (about −2.5 V for several seconds) to the upper electrode 22 with respect to the lower electrode 12, a silver thin film is deposited on the particle deposited layer 32 on the surface of the upper electrode 22. When a silver film precipitates on the particle deposited layer 32 in which ITO particles of hundred nm order are deposited, the light rays incident on the silver film are randomly reflected (or plasmon-absorbed). In this case, the ED element presents light shielded state (appears black).

In this way, by providing a particle deposited layer in the ED element, it is possible to realize in addition to transparent state, mirror state, and colored state, further light shielded state.

Figure 6C:
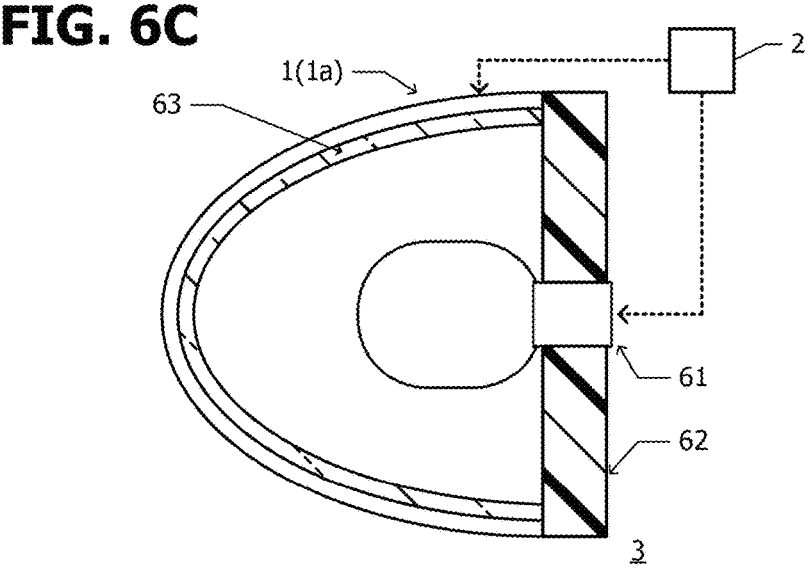

FIG. 6C is a cross section showing an application of the optical apparatus according to the embodiment. The optical apparatus (ED element and power source) according to the embodiment can be used for example in automobile lighting (head light or rear lamp unit).

As shown in FIG. 6C, a head light unit 3 comprises a light source 61 which can emit white lights, support 62 for supporting the light source 61, a cover 63 disposed to cover the light source 61, an ED element 1 pasted on the outer surface of the cover 63, and a power source 2 for driving the ED element 1. The head light unit may further contain optical lenses, reflector plates, etc. The ED element 1 may be substituted by the modification ED element 1*a*.

As the light source 61, an incandescent or fluorescence lamp, or a semiconductor light emitting element (LED) may be used. As the support 62, it will be preferable to use member having a superior heat resisting property. The cover may be formed of acrylic resin, and work as light distributing element (so-called outer lens).

The ED element 1 is pasted on the outer surface of the cover 63. Since the lower and upper substrates of the ED element 1 is formed of flexible substrates (film-shaped substrates), the ED element 1 can be pasted while being adapted to the surface shape of the cover 63. The ED element 1 may also be pasted on the inner surface of the cover 63.

The power source 2 can supply stepped voltage or dc voltage between the lower and upper electrodes of the ED element 1 (or ED element 1*a*). Thereby, transparent state, mirror state, colored state (or light shielded state) of the ED element can be controlled. The power source 2 may be used also as power source for the light source 61.

By supplying predetermined stepped voltage to the ED element 1, it is possible to emit colored lights (red lights or blue lights) from the head light unit 3. It will also be possible to improve outside appearance of the automobile by varying the state (transparent, mirror, colored, or light shielded state) of the ED element 1, in response to the color and quality of the automobile carrying the head light unit.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What are claimed are:

1. An optical apparatus comprising:
an optical element; and
a power source,
wherein the optical element comprises:
first and second substrates disposed to face each other and having flexibility, the first substrate having a first electrode provided on a surface of the first substrate nearer to the second substrate, and the second substrate having a second electrode provided on a surface of the second substrate nearer to the first substrate, and
an electrolyte layer sandwiched between the first and the second substrates, and containing electro-deposition material including silver;
a sealing member sandwiched between the first and the second substrates and surrounding the electrolyte layer, and shaped into a frame with four side portions in plan view;
concaves provided on an inside edge of one of the side portions constituting the sealing member; and
swellings provided on an outside edge of the side portion on which the concaves are provided, and paired and faced with the concaves, respectively, and
wherein the power source is connected to the first and second electrodes, and is capable of applying voltage to the electrolyte layer through the first and second electrodes and changing color states of the optical element.

2. The optical apparatus according to claim 1, wherein when potential of the first electrode is used as reference, the power source is capable of applying a first voltage of positive polarity in a first period to the second electrode, and applying a second voltage of positive polarity lower than the first voltage in a second period after the first period to the second electrode.

3. The optical apparatus according to claim 2, wherein when potential of the first electrode is used as reference, the power source is capable of applying positive dc voltage to the second electrode.

4. The optical apparatus according to claim 2, wherein the second substrate includes a conductive irregular surface layer, the surface of which is at least rougher than the surface of the first electrode, provided on the surface of the second electrode.

5. The optical apparatus according to claim 4, wherein the power source is also capable of supplying a negative dc voltage to the second electrode when potential of the first electrode is used as reference.

6. Automobile lighting comprising:
a light source capable of emitting white lights;
a cover member disposed to cover the light source, and having a lens function;
an optical element disposed on an inner or outer surface of the cover member, and comprising:
first and second substrates disposed to face each other and having flexibility, the first substrate having a first electrode provided on a surface of the first substrate nearer to the second substrate, and the second substrate having a second electrode provided on a surface of the second substrate nearer to the first substrate, and
an electrolyte layer sandwiched between the first and the second substrates, and containing electro-deposition material including silver;
a sealing member sandwiched between the first and the second substrates and surrounding the electrolyte layer, and shaped into a frame with four side portions in plan view;
concaves provided on an inside edge of one of the side portions constituting the sealing member; and
swellings provided on an outside edge of the side portion on which the concaves are provided, and paired and faced with the concaves, respectively; and
a power source connected to the first and second electrodes, and being capable of applying voltage to the electrolyte layer through the first and second electrodes and changing color states of the optical element.

7. The automobile lighting according to claim 6, wherein the second substrate of the optical apparatus includes a conductive irregular surface layer, the surface of which is at least rougher than the surface of the first electrode, provided on the surface of the second electrode.

8. The automobile lighting according to claim 6, wherein when potential of the first electrode is used as reference, the power source is capable of applying a first voltage of positive polarity in a first period to the second electrode, and applying a second voltage of positive polarity lower than the first voltage in a second period after the first period to the second electrode.

* * * * *

UNITED STATES PATENT AND TRADEMARK OFFICE
CERTIFICATE OF CORRECTION

PATENT NO. : 9,588,394 B2
APPLICATION NO. : 14/511016
DATED : March 7, 2017
INVENTOR(S) : Hiroto Fukushima et al.

It is certified that error appears in the above-identified patent and that said Letters Patent is hereby corrected as shown below:

On the Title Page

Item (73) Assignee:
Change "STANLEY ELECTRIC CO., LTD., CHIBA-SHI, CHIBA (JP)" to
--STANLEY ELECTRIC CO., LTD., MEGURO-KU, TOKYO (JP)--.

After "STANLEY ELECTRIC CO., LTD., MEGURO-KU, TOKYO (JP)" insert
--; NATIONAL UNIVERSITY CORPORATION CHIBA UNIVERSITY, CHIBA-SHI, CHIBA (JP)--.

Signed and Sealed this
Twenty-first Day of November, 2017

Joseph Matal
*Performing the Functions and Duties of the*
*Under Secretary of Commerce for Intellectual Property and*
*Director of the United States Patent and Trademark Office*